United States Patent Office 3,041,300
Patented June 26, 1962

3,041,300
POLYGLYCIDYL ETHERS OF ETHER ANHYDRO HEXITOLS, METHOD OF PRODUCTION, AND AQUEOUS SOLUTIONS THEREOF
James G. Morrison, Moon Township, Allegheny County, Pa., assignor, by mesne assignments, to Martin-Marietta Corporation, Stoner-Mudge Company Division, Chicago, Ill., a corporation of Maryland
No Drawing. Filed Oct. 6, 1959, Ser. No. 844,628
15 Claims. (Cl. 260—29.2)

The present invention relates to water-soluble polyglycidyl ethers of cyclic anhydro hexitols, the production of said polyglycidyl ethers and water solutions containing the same.

The production of epoxy resins which are polyglycidyl ethers of polyhydric compounds is well known. The polyglycidyl ethers and particularly the diglycidyl ethers of aromatic dihydroxy compounds, especially bisphenols, have achieved considerable commercial importance because of the physical toughness and chemical inertness of cured epoxy resins based thereon. Unfortunately, the polyglycidyl ethers of aromatic polyhydric compounds are, by and large, water-insoluble, and this has substantially limited the usefulness of these resins.

The polyglycidyl ethers of aliphatic polyhydric materials, and especially glycols, glycerol and polyglycols, have also been produced. Some of these are water-dispersible raising considerable interest in the use of epoxy resins in water medium and the possibility of providing epoxy cross-linking reactants in water medium containing resinous materials reactive with epoxy resin. Unfortunately, the known aliphatic polyglycidyl ethers are not soluble in water necessitating the use of emulsifying agents and limiting reactivity in water medium particularly with respect to other resinous materials which are dispersed but not dissolved in the water.

In accordance with the present invention, it has been found that the cyclic ether anhydro hexitols, and particularly hexitols having the formula prior to dehydration of $C_6H_8(OH)_6$, may be reacted in a single stage with epihalohydrins in the presence of a strongly basic material such as sodium hydroxide to form polyglycidyl ethers of anhydro hexitols possessing low hydrolyzable chlorine content in the range of from 0.01–0.4%, particularly when the reaction medium is maintained substantially anhydrous.

It has also been found that the glycidyl ethers of cyclic ether anhydro hexitols, as defined above, can be dissolved in water in large proportions to form water solutions. These solutions are frequently characterized by infinite dilutability with water and the provision of water solutions containing from 0.05–15% by weight of epoxy resin is a feature of the invention.

The invention is particularly directed to polyglcidyl ethers of dihydric dianhydro hexitols such as 1,4:3,6-dianhydro-D-sorbitol and 1,4:3,6-dianhydro-D-mannitol. As is known, these compounds contain two heterocyclic ether oxygen atoms.

While the dianhydro hexitols specified above are preferred, other similar dianhydro hexitols which may be employed are illustrated by 1,4:3,6-dianhydro-D-talitol, 1,4:3,6-dianhydro-L-iditol and 1,5:3,6-dianhydro-D-mannitol.

While the invention is particularly directed to dianhydro hexitols which function as diols, the invention includes monoanhydro hexitols such as 1,5-anhydro-D-sorbitol, 1,4-anhydro-D-sorbitol, 3,6-anhydro-D-sorbitol, 1,4-anhydro-D-mannitol, 1,5-anhydro-D-mannitol, 1,5-anhydro-D-dulcitol, 3,6-anhydro-D-dulcitol and 1,5-anhydro-D-talitol.

The invention is adapted to the production of polyglycidyl ethers from pure cyclic ether anhydro hexitols such as those referred to above or mixtures thereof. It is of importance, however, that polyhydric compounds having more than two hydroxyl groups per molecule and which are not heterocyclic ethers be substantially absent from the mixture which is treated; e.g., the mixture should contain less than about 10% of hexitol compound or ether-linked polymers thereof.

The conventional procedure reported in the literature for producing epoxy resins from aliphatic polyols involves a two-step procedure. In the first stage of the reaction epichlorohydrin is reacted with the aliphatic polyol using a Lewis acid type catalyst to produce a halohydrin derivative. In the second stage of the reaction the halohydrin derivative is dehydrohalogenated using a basic reagent illustrated by sodium aluminate, sodium silicate or sodium zincate, to thereby produce the epoxy resin derivative.

When this conventional two-step procedure is applied to cyclic ether hexitol anhydrides such as, for example, 1,4:3,6-dianhydro-D-sorbitol, the product produced has an epoxy value which is only about 25% of the epoxy value which theoretically could be obtained by forming the diglycidyl ether monomer and possesses a high hydrolyzable chlorine content despite prolonged reaction (21 hours).

It is also known to produce epoxy resins by a single stage treatment with strong alkali, this procedure being normally applied to the production of epoxy resins from aromatic polyols. In such reaction the presence of water is not critical to the production of satisfactory epoxy resins or to the recovery of such resins from the organic phase of the reaction product.

In accordance with the invention, cyclic ether anhydro hexitol is refluxed with excess epichlorohydrin in the presence of strong alkali, e.g., caustic soda, and the reaction is permitted to proceed with azeotropic removal of water. Under these conditions the reaction proceeds smoothly to form a polyglycidyl ether of the starting cyclic ether anhydro hexitol. Using a cyclic ether hexitol dianhydride, e.g., 1,4:3,6-dianhydro-D-sorbitol, the product has an epoxy value of at least 0.4 equivalent per 100 grams and a hydrolyzable chlorine content of 0.05–0.4%. The epoxy value is normally about 0.5 equivalent per 100 grams which represents about 65% of the epoxy value theoretically attainable through the formation of diglycidyl ether monomer.

Interestingly, when the above single-stage procedure is applied to the parent hexitol compound, e.g., sorbitol, the result is the production of an insoluble gel. Similarly, when this same single-stage reaction procedure is attempted upon a mixture containing a substantial proportion of sorbitol, e.g., about 30%, the result is the production of a semi-gel, the bulk of which is insoluble.

The continuous removal of water is important in accordance with the invention. When the reaction is performed in the presence of water, e.g., by failing to remove the water introduced into the reaction mixture, said water being present by addition of caustic as a 50% aqueous solution and as a by-product of the reaction, two layers are formed when the reaction mass is cooled. The upper organic layer contains an epoxy material which is a viscous liquid having a viscosity of 19,000 centipoises, an epoxy value of only 0.231 equivalent per 100 grams and a hydrolyzable chlorine content of 4.22%. The aqueous layer also contains a substantial amount of epoxy material but this material, upon isolation, has an epoxy value of only 0.096 equivalent per 100 grams, a hydrolyzable chlorine content of 3.76% and a viscosity of 35,200 cps. The product produced in the presence of a greater proportion of water contains an even lower epoxy value. Accordingly, the presence of substantial amounts of water in the reaction mixture during the reaction is detrimental.

Accordingly, it is surprising, in accordance with the invention, to find that epichlorohydrin can be reacted with cyclic ether anhydro hexitols and particularly the dianhydrides in the presence of an excess of epichlorohydrin, e.g., in a 5/1 molar ratio, in a single-stage reaction in the presence of strong alkali and with continuous removal of water (the water concentration in the reaction mixture is maintained below 5%) to produce products having an epoxy value of at least about 0.4 equivalent per 100 grams, a hydrolyzable chlorine content of about 0.2% and a viscosity of about 8,000 centipoises which are water soluble and which can be dissolved in water to form relatively stable water solutions.

The water solutions of the invention are adapted for diverse utility. Thus, textiles such as cotton or wool may be impregnated with the water solutions of the invention containing dissolved or dispersed hardening agents for epoxy resins and then heated to dry the same and cure the epoxy resin to provide a crease-proof and water-repellant finish. The water solutions of the invention may also be used in aqueous printing inks, as additives in aqueous dye baths and as cross-linking agents for the hardening of synthetic resin fibers which are spun into aqueous solutions and which contain reactive groups such as hydroxyl, amine, amide, mercaptan or carboxyl groups which can condense with the oxirane groups of the epoxy resins of the invention. Thus, the epoxy resins of the invention may be used in the aqueous baths into which regenerated cellulose, cellulose acetate or proteinaceous fibers are extruded.

The epoxy resins of the invention may also be used in aqueous pulps of textile or paper fibers to improve the wet strength of paper or other fibrous web which is deposited.

An important feature of the invention is the dissolution of the epoxy resins of the invention into aqueous medium containing dispersed or preferably dissolved resins reactive with the oxirane group to form aqueous mixtures curable at room or elevated temperature and which are adapted to form films, preferably adherent coatings upon glass, metal, ceramic, paper, etc. These water solutions also provide desirable coatings or impregnants for wood and other porous bodies such as fiberboard. Resins reactive with the epoxy resins of the invention are illustrated by carboxylic-containing copolymers such as copolymers of styrene or acrylic or methacrylic esters such as butyl methacrylate with acrylic or methacrylic acids. Water soluble phenol-formaldehyde resins may also be cured in the presence of dissolved epoxy resins in accordance with the invention to accelerate the curing reaction. Acidic adducts of unsaturated polycarboxylic acids with drying oils or drying oil fatty acids such as maleated linseed oil dissolved in aqueous medium with the aid of ammonia or other water-soluble alkaline agent, preferably a volatile amine, may also be cured by the presence in the water solution of water-soluble epoxy resins produced in accordance with the invention.

The water-soluble epoxy resins of the invention are also useful as a dispersing agent or dissolving agent for other materials which are not ordinarily water-soluble or dispersible. Thus, the diglycidyl ether derivative of glycerol is not water-soluble but water solutions may be produced by dissolution in the water of appropriate proportions of the epoxy resin of the invention, e.g., from about 25% to about 50% based on the combined weight of epoxy resins. Similarly, high molecular weight polyglycols such as polypropylene glycol having a molecular weight of about 2,000 and which normally cannot be effectively dispersed in water is made water dispersible by dissolution in the aqueous medium of the water-soluble epoxy resins of the invention.

The preparation of epoxy resins from anhydro hexitols in accordance with the invention is illustrated in the examples which follow. In these examples, a preferred proportion of epichlorohydrin to hexitol of from 5/1 to 10/1 is employed. The molar ratio of epichlorohydrin to hexitol may exceed these limits and range from a minimum of at least 3/1 up to about 15/1.

Example I

A reaction vessel was charged with 876 parts (6.01 mols) of 1,4:3,6-dianhydro-D-sorbitol and 5,500 parts (59.5 mols) of epichlorohydrin. The solution of 1,4:3,6-dianhydro-D-sorbitol in epichlorohydrin was heated with stirring to a temperature of 115° C. During a period of 10 hours, 996 parts of 50% aqueous sodium hydroxide (12.3 mols) were added incrementally to the boiling reaction mixture. The rate of addition of the aqueous caustic and the heating of the reaction mixture were controlled so that the reaction temperature was from 109° C. to 115° C. During the reaction, the water and epichlorohydrin were continuously distilled from the reaction mixture. The condensed distillate was collected and separated. The lower epichlorohydrin layer was continually returned to the reaction mixture. The aqueous layer was removed and separated. The concentration of water in the reaction mixture was maintained at about 1%. Heating was continued for 15 minutes after all the caustic was added in order to complete the removal of water from the reaction mixture. A total of 725 parts of aqueous layer was separated and collected. The reaction mixture was then subjected to distillation for removal of unreacted epichlorohydrin by heating to 150° C. under an absolute pressure of 20 mm. of mercury. 4,763 parts of epichlorohydrin were recovered in this manner.

To separate the salt from the crude product, 1560 parts of acetone were added with stirring and the mixture filtered. The salt cake was washed with additional acetone and the washings combined with the filtrate. The mixture was then distilled to remove acetone by heating to 150° C. under an absolute pressure of 20 mm. of mercury. This resulted in 1419 parts of a product having an epoxy equivalent per 100 grams of resin of 0.467 and containing 0.11% hydrolyzable chlorine.

Example II

A reaction vessel was charged with 584.6 parts (4 mols) of 1,4:3,6-dianhydro-D-sorbitol and 1850 parts (20 mols) of epichlorohydrin. The solution of 1,4:3,6 dianhydro-D-sorbitol in epichlorohydrin was heated with stirring to a temperature of 115° C. During a period of 8 hours, 653 parts of 50% aqueous sodium hydroxide (8.16 mols) were added incrementally to the boiling reaction mixture. The rate of addition of the aqueous caustic and the heating of the reaction mixture were controlled so that the reaction temperature was from 109° C. to 115° C. During the reaction, the water and epichlorohydrin were continuously distilled from the reaction mixture. The condensed distillate was collected and separated. The lower epichlorohydrin layer was continually returned to the reaction mixture. The aqueous layer was removed and separated. The concentration of water in the reaction mixture was maintained at about 1%. Heating was continued for 15 minutes after all the caustic was added in order to complete the removal of water from the reaction mixture. A total of 465 parts of aqueous layer was separated and collected.

The reaction mixture was then subjected to distillation for removal of unreacted epichlorohydrin by heating to 150° C. under an absolute pressure of 20 mm. of mercury. 976 parts of epichlorohydrin were recovered in this manner.

To separate the salt from the crude product, 1040 parts of acetone were added with stirring and the mixture filtered. The salt cake was washed with additional acetone and the washings combined with the filtrate. The mixture was then distilled to remove acetone by heating to 150° C. under an absolute pressure of 20 mm. of mercury. This resulted in 921 grams of a product having an epoxy equivalent per 100 grams of resin of 0.451 and containing 0.23% hydrolyzable chlorine.

*Example III*

A reaction vessel was charged with 876 parts (6 mols) of 1,4:3,6 dianhydro-D-mannitol and 5500 parts (59.5 mols) of epichlorohydrin. The solution of 1,4:3,6 dianhydro-D-mannitol in epichlorohydrin was heated with stirring to a temperature of 115° C. During a period of 10 hours, 996 parts of 50% aqueous sodium hydroxide (12.3 mols) were added incrementally to the boiling reaction mixture. The rate of addition of the aqueous caustic and the heating of the reaction mixture were controlled so that the temperature was from 109° C. to 115° C. During the reaction the water and epichlorohydrin were continuously distilled from the reaction mixture. The condensed distillate was collected and separated. The lower epichlorohydrin layer was continually returned to the reaction mixture. The aqueous layer was removed and separated. The concentration of water in the reaction mixture was maintained at about 1%. Heating was continued for 15 minutes after the caustic was added in order to complete the removal of water from the reaction mixture. A total of 715 parts of aqueous layer was separated and collected. The reaction mixture was then subjected to distillation for removal of unreacted epichlorohydrin by heating to 150° C. under an absolute pressure of 20 mm. of mercury. 4,790 parts of epichlorohydrin were recovered in this manner.

To separate the salt from the crude product 1560 parts of acetone were added with stirring and the mixture filtered. The salt cake was washed with additional acetone and the washings combined with the filtrate. The mixture was then distilled to remove acetone by heating to 150° C. under an absolute pressure of 20 mm. of mercury. This resulted in 1425 parts of a product having an epoxy equivalent per 100 grams of resin of 0.475 and containing 0.14% hydrolyzable chlorine.

*Example IV*

An equi-weight mixture of 1-4-, and 1-5-anhydro-D-sorbitol was reacted with epichlorohydrin using excess epichlorohydrin and aqueous sodium hydroxide as described in Examples I, II and III.

Products were obtained having an epoxy value of 0.35 to .17 epoxy equivalent per 100 grams of resin having 0.31 to .09 percent hydrolyzable chlorine.

The epoxy resins of the present invention having a hydrolyzable chlorine content of less than 0.4% may be liquids of low molecular weight or possess higher molecular weight providing more viscous liquids or even solid resins. These higher molecular weight products are most conveniently prepared by upgrading an excess of the epoxy resins provided in Examples I–IV with additional hexitol anhydride, e.g., most preferably 1,4:3,6-dianhydro-D-sorbitol, conventional upgrading procedures being applicable. The higher molecular weight products possess lowered epoxy values and may have an epoxy value as low as about 0.03 equivalents per 100 grams of resin while still providing a reactive and water-soluble resin.

In any event, regardless of molecular weight, the epoxy resins of the present invention have a 1,2 epoxy equivalency of at least about 1.3 up to about 2.0.

The invention is defined in the claims which follow.

I claim:

1. Water-soluble polyglycidyl ethers of cyclic ether anhydro hexitols having a 1,2 epoxy equivalency of from about 1.3 to about 2.0, an epoxy value of at least 0.03 epoxy equivalent per 100 grams and an hydrolyzable chlorine content of from 0.01–0.40 percent.

2. Water-soluble polyglycidyl ethers as recited in claim 1 in which said cyclic ether anhydro hexitols are dihydric dianhydro hexitols and said polyglycidyl ethers have an epoxy value of at least 0.40 epoxy equivalent per 100 grams.

3. Water-soluble polyglycidyl ethers as recited in claim 2 in which said cyclic ether anhydro hexitols are selected from the group consisting of 1,4:3,6-dianhydro-D-sorbitol and 1,4:3,6-dianhydro-D-mannitol.

4. Water-soluble polyglycidyl ethers as recited in claim 2 having a viscosity measured at room temperature of about 8,000 centipoises.

5. A water solution containing dissolved therein polyglycidyl ethers of cyclic ether anhydro hexitols having a 1,2 epoxy equivalency of from about 1.3 to about 2.0, an epoxy value of at least 0.03 epoxy equivalent per 100 grams and an hydrolyzable chlorine content of from 0.01–0.40%.

6. A water solution as recited in claim 5 in which said cyclic ether anhydro hexitols are dihydric dianhydro hexitols and said polyglycidyl ethers have an epoxy value of at least 0.40 epoxy equivalent per 100 grams.

7. A water solution as recited in claim 5 in which said cyclic ether anhydro hexitols are selected from the group consisting of 1,4:3,6-dianhydro-D-sorbitol and 1,4:3,6-dianhydro-D-mannitol.

8. A water solution as recited in claim 5 in which said polyglycidyl ethers are present in an amount of from 0.05–15 percent by weight.

9. A method of producing water-soluble polyglycidyl ethers of cyclic ether anhydro hexitols having a 1,2 epoxy equivalency of from about 1.3 to about 2.0, an epoxy value of at least 0.29 epoxy equivalents per 100 grams and an hydrolyzable chlorine content of from 0.01–0.40% comprising reacting cyclic ether anhydro hexitol with epihalohydrin, the molar ratio of epihalohydrin to said anhydro hexitol being in the range of from 3/1 to about 15/1, said reaction being performed in the presence of strong alkali, and removing water during said reaction to maintain a concentration of water of less than 5% by weight.

10. A method as recited in claim 9 in which said strong alkali is sodium hydroxide.

11. A method as recited in claim 9 in which said reaction is effected by refluxing the reaction mixture while azeotropically removing water present in the reaction mixture to maintain a water concentration of less than about 1% by weight.

12. A method of producing water-soluble polyglycidyl ethers of cyclic ether anhydro hexitols having a 1,2 epoxy equivalency of from about 1.3 to about 2.0, an epoxy value of at least 0.40 epoxy equivalent per 100 grams and an hydrolyzable chlorine content of from 0.01–0.40% comprising reacting dihydric cyclic ether dianhydro hexitol having the formula prior to dehydration of $C_6H_8(OH)_6$ and containing less than 10% of polyhydric compound having more than two hydroxyl groups per molecule and which are not heterocyclic ethers with epichlorohydrin, the molar ratio of epichlorohydrin to said anhydro hexitol being in the range of from 3/1 to about 15/1, said reaction being performed by refluxing the mixture of said anhydro hexitol and epichlorohydrin in the presence of sodium hydroxide while azeotropically removing water to maintain a substantially anhydrous reaction mixture.

13. A method as recited in claim 12 in which the molar ratio of epichlorohydrin to said anhydro hexitol is in the range of from 5/1 to 10/1.

14. A method as recited in claim 12 in which said cyclic ether dianhydro hexitol is selected from the group consisting of 1,4:3,6-dianhydro-D-sorbitol and 1,4:3,6-dianhydro-D-mannitol.

15. A method as recited in claim 12 in which said reaction is effected in a single stage.

References Cited in the file of this patent
UNITED STATES PATENTS

| | | |
|---|---|---|
| 2,420,519 | Brown | May 13, 1947 |
| 2,581,464 | Zech | Jan. 8, 1952 |
| 2,898,349 | Zuppinger et al. | Aug. 4, 1959 |